United States Patent [19]

Vinton

[11] 4,240,863
[45] Dec. 23, 1980

[54] CONTROL SYSTEM FOR AN ELASTOMER EXTRUSION AND APPLICATOR APPARATUS

[75] Inventor: David S. Vinton, Morton, Ill.

[73] Assignee: Caterpillar Tractor Co., Peoria, Ill.

[21] Appl. No.: 29,246

[22] Filed: Apr. 12, 1979

[51] Int. Cl.³ .......................................... B29H 17/37
[52] U.S. Cl. .................................. 156/361; 156/130; 156/187; 156/397; 156/446
[58] Field of Search ................... 156/110 R, 117, 123, 156/128, 130, 185–187, 350, 361, 394, 397, 425, 446

[56] References Cited

U.S. PATENT DOCUMENTS

| 3,251,722 | 5/1966 | Holman | 156/130 |
| 3,268,380 | 8/1966 | Guichon | 156/130 |
| 3,975,126 | 8/1976 | Wireman et al. | 425/141 |
| 4,155,789 | 5/1979 | Wireman et al. | 156/130 |

OTHER PUBLICATIONS

CSR Pamphlet, "Auxiliary Equipment for Speed and Position Control Systems," Pittsburgh, Pa.
"Incremental Encoders and Systems Handbook," by Trump-Ross, North Billerica, Mass.
"Automatic Control Systems," Ben Zeimes, Prentice Hall, pp. 81–97.
"Introduction to Control Theory for Engineers," by Sensicle, Hart Pub. Co., New York, N. Y., 1968, pp. 1–14.
"Tire Equipment High Performance Auto/Calender System," by Tire Equipment Div. of AMF Inc., Santa Ana, California, pp. 1–5.

Primary Examiner—John E. Kittle
Attorney, Agent, or Firm—Wegner, Stellman, McCord, Wiles & Wood

[57] ABSTRACT

A control system for an elastomer extrusion and application apparatus (10,16) including an extrusion rate measuring device (60,200) for receiving a ribbon (12) of extruded elastomer and for providing a signal representing the rate of extrusion, a drive (18) for moving an article (14) to have the ribbon of extruded elastomer applied thereto in a predetermined path, an applicator (16,20,22) along the path for receiving the ribbon and applying the same to the article, a resolver (176) connected to the applicator for providing a signal representative of the rate of application of the ribbon to the article, and a control (FIG. 5) for controlling the speed of the article drive including a circuit for receiving the signals and adjusting the speed of the drive to match a desired proportion between the rate of extrusion and the rate of application.

17 Claims, 5 Drawing Figures

FIG.4.
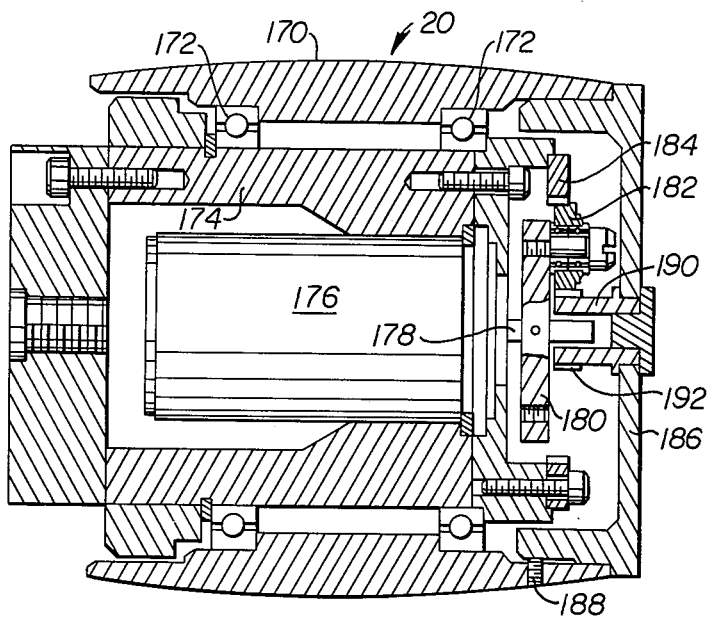
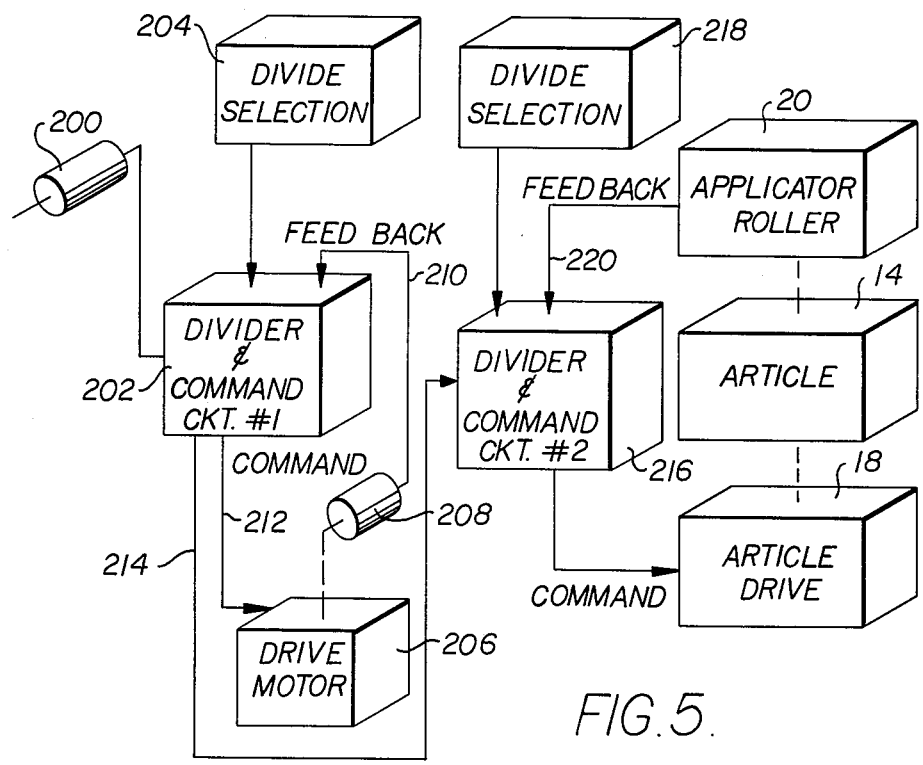
FIG.5.

CONTROL SYSTEM FOR AN ELASTOMER EXTRUSION AND APPLICATOR APPARATUS

DESCRIPTION

1. Technical Field

This invention relates to apparatus for extruding elastomeric material and applying the same to an article, and more particularly, to a control system for such an apparatus.

2. Background Art

Prior art of possible relevance includes the following U.S. Pat. No.: 3,251,722 issued May 17, 1976 to Holman; U.S. Pat. No. 3,268,380 issued Aug. 23, 1966 to Guichon; and U.S. Pat. No. 3,975,126 issued Aug. 17, 1966 to Wireman et al. Also of possible relevance is a publication entitled "Tire Equipment High Performance Auto/Calender System", data of publication unknown, published by the Tire Equipment Division of AMF Inc., N.Y. St., U.S. of Amer.

Many articles formed in part of elastomeric materials are built-up by laying up an elastomeric ribbon on some sort of an article core. This technique is frequently employed in tire manufacture or retreading operations as, for example, in building up the sidewall and/or crown portion of a pneumatic tire carcass which may be new or used.

The process of manufacturing other elastomeric articles such as bladders, tire sidewall protectors, or the like, may also employ a ribbon lay-up process.

In any event, in many instances, it is desired to provide relatively close control over the final exterior dimensions of the article being formed for any of a variety of reasons. In the case of tires, the final size of the tire is obviously important since the same will be matched with other tires which must be of like size and shape. In addition, if more rubber ribbon is laid up on the tire carcass than is necessary to achieve the desired final size, it may become necessary to trim away excess rubber before placing the tire in a mold for fnal curing. Close control of the application operation can avoid or minimize the need for such trimming. And, of course, when trimming is required, some wastage of material may result thereby contributing to the material expense in fabricating the article.

In the usual case, the rubber ribbon used in the lay-up process is formed by an extruder and then passed to calender rolls which will provide the ribbon with a constant cross section. If the ribbon received from the calender rolls was received at a uniform rate, the application of the ribbon to an article to be formed moving in a predetermined path in a uniform manner could be accomplished simply by moving the article in its path at a uniform rate of speed matched to the rate of extrusion. However, as is well known, it is extremely difficult, if not impossible, to obtain accurate control over the rate of output of an extruder thereby making it impossible to achieve application of the ribbon to an article, in a closely controlled fashion, by moving the article uniformly in its path.

Moreover, in many instances, it is highly desirable to continuously provide a uniform degree of stretch to the ribbon after it has been extruded and prior to its application to the article to achieve accurate dimension control of the strip at the time it is being applied to the article. Consequently, many systems have been proposed and commercially exploited wherein some sort of means are employed to vary the rate of application of the ribbon to the article proportionally to the rate of extrusion or forming of the ribbon to account for the variations attendant the extruding operation.

The above-identified patents and publication exemplify approaches of this type.

However successful these approaches may be in some applications, they nonetheless fail to provide the extremely accurate stretch control necessary to achieving extremely accurate dimension control of the rubber strip at the precise point of application to the article.

The problem is further compounded where the ribbon applicator's position with respect to the article is varied during the forming process about several axes. Since the extruder will normally be at a fixed position and the position of the applicator will vary with respect thereto, the length of the ribbon and its stretch between the extruder and the applicator will typically vary as the applicator is moved with respect to the extruder. This, of course, will vary the degree of stretch of the ribbon between the two which in turn will alter the cross section dimension of the ribbon. Consequently, product uniformity may suffer and/or it is necessary to lay up more rubber on the article than is necessary and trim the excess to insure that an adequate amount of rubber is applied to the article in the first instance.

And, of course, the variations attendant the operation of such systems make it extremely difficult to achieve full automation of the process without the need of frequent monitoring. consequently, the expense of labor to practice such processes is increased by reason of the need for an observer.

DISCLOSURE OF INVENTION

In one aspect of the present invention there is provided a control system for an elastomer extrusion and application apparatus including an extrusion rate mesuring means adapted to be associated with the output of an extruder for receiving a ribbon of extruded elastomer and providing a signal representing the rate of extrusion. Means are provided for moving an article to have the ribbon applied thereto in a predetermined path and an applicator is disposed along the path for receiving the ribbon of extruded elastomer and applying the same to the article. Means are connected to the applicator providing a signal representative of the rate of application of the ribbon to the article and a control is utilized for controlling the speed of the article moving means which includes means for receiving the signals and adjusting the speed of the moving means to match a desired proportion between the rate of extrusion and the rate of application.

As a consequence of this system, desired stretch can be closely controlled to achieve accurate dimension control of the ribbon at the point of application since the control function is exerted at the immediate end of the path of the ribbon prior to application thereby eliminating from the process the effect caused by variations in the process at all points upstream of the point of application.

In another aspect of the invention, there is provided such an extrusion and application control system which further includes means whereby the path that the ribbon may take in passing to an applicator whose position is controlled about a variety of axes may vary between two points including the point of application but is of fixed length so that movement of the applicator relatively to the source of the ribbon does not change the degree of stretch of the ribbon between the two points. Again, accurate dimension control is achieved.

Other objects and advantages of the invention will become apparent from the following specification and claims.

BRIEF DESCRIPTION OF DRAWINGS

FIG. 4 is a sectional view illustrating an applicator roller and rate sensing device; and FIG. 5 is a block diagram of a control circuit for the apparatus.

BEST MODE FOR CARRYING OUT THE INVENTION

The present invention is intended to provide a control system wherein highly accurate dimensional control over an elastomeric strip applied to an article is exercised to the point that a high degree of automation can be achieved. It is intended that a number of the components of the system be computer controlled in the sense of providing a desired sequence of events. In general, the principal computer control to be exercised over the ribbon applicator which applies the ribbon to the article at varying locations thereon. Since this desired sequence of events will be dependent upon the size and shape as well as the nature of the article, it can be readily appreciated that the precise sequencing as it relates to actual application is not a material part of the present invention but will be determined by the nature of the article to which the strip is applied. With this in mind, the invention will be described in detail.

Figure 1:
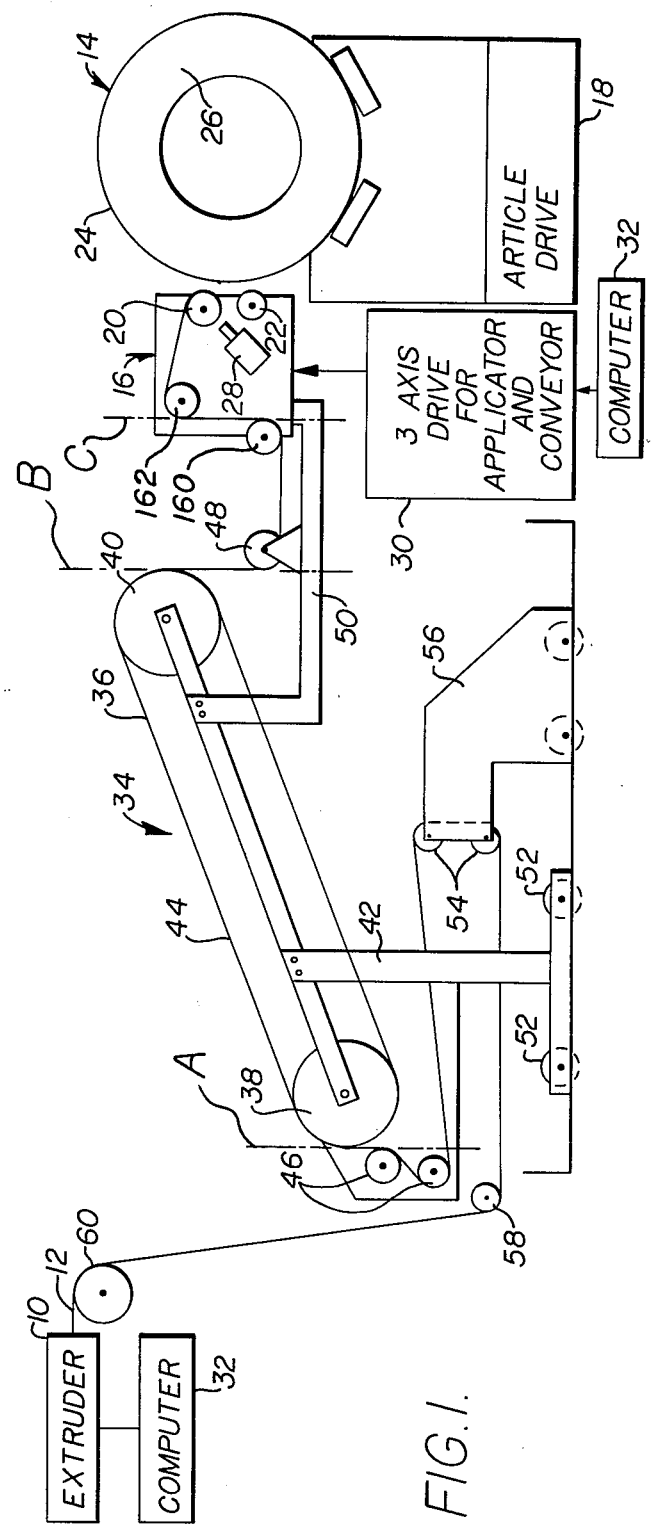
FIG. 1 is a somewhat schematic, side elevation of the mechanical structure employed in an apparatus for extruding and applying a ribbon to an article and controlled by the control system of the present invention.

A typical system with which the invention may be used includes an extruder or calender rolls 10 which generates a ribbon 12 of elastomeric material, usually rubber, having a desired cross sectional shape. The ribbon 12 is ultimately conveyed to an article 14 for application thereto by an applicator, generally designated 16. As illustrated in FIG. 1, the article 14 is a tire carcass and the applicator 16 will apply the ribbon to any desired point on the tire 14. During such application, the tire 14 is moved in a predetermined path by an article drive system 18. In the usual case, the path in which the tire 14 is moved will be a rotary path with the tire 14 being rotated about its intended axis of revolution.

In general, the applicator 16 will include a conventional applicator roller 20 over which the ribbon passes to be pressed against the tire 14 at a desired location. The applicator 16 will also include a plurality of stitcher rolls 22 (only one of which is shown) which are employed for the usual purpose. It will be observed that the stitcher rolls 22 are downstream from the applicator roller 20 in the direction of ribbon movement.

As alluded to previously, the applicator 16 is utilized to apply the ribbon to almost any point on the tire 14 as, for example, the crown 24 and the sidewalls 26. To a limited extent the applicator 16 may apply the ribbon 12 to the interior of the tire 14 although such application will frequently limited by the geometry of the applicator 16 and of the tire 14, interference between the two being the limiting factor, if any.

For purposes to be seen, the applicator 16 includes a brake 28 by which the applicator roll 20 may be restrained.

In operation, the tire 14, after the applicator 16, and specifically, the applicator roll 20 has brought the ribbon 12 into contact with the tire 14, will be driven at a controlled rate in its path by the article drive 18 so as to draw the ribbon 12 over the applicator roll 20. When the desired buildup of rubber has been achieved, the ribbon 12 may be automatically severed simply by braking the applicator roll 20 with the brake 28 and thereafter continuing rotation of the tire 14 for a short amount to stretch the ribbon 12 between the stitcher rolls 22 and the applicator roll 20 to the point of breakage. This will allow a short length of the ribbon 12 to extend past the applicator roll 20 toward the stitcher roll 22 to enable easy start-up of the next application cycle simply by bringing the applicator roll 20 into contact with the tire 14.

To achieve the previously described ability to apply the ribbon 12 to the tire at a variety of locations, the applicator 16 is provided with the capability for movement about three axes. A first axis about which control is exerted is an axis of movement of the applicator 16 towards and away from the path in which the article is moved. The second axis of movement of the applicator 16 will be generally transverse to the first axis (either straight line, or along a shallow arc) so as to enable selection of the particular location on the tire 14 whereat the ribbon is to be applied. The third axis of control is generally a rotational axis provided such that the applicator roll 20 will generally be facing the tire 14 at some desired angle as, for example, a right angle. Accordingly, various movable mounts for the applicator 16 may be provided to allow movement of the same about the aforementioned three axes as well as controlled drives for correctly positioning the applicator 16 on each such axis. The means by which such mounting of the applicator 16 and of the control of the same in terms of its position on any of the three axes will be described in considerable detail hereinafter. For present purposes it is sufficient to say that a suitable drive such as that shown schematically at 30 for the applicator 16 about all three axes is provided and the drive 30 may receive its instructions from, for example, a computer 32 or a tape (not shown) suitably programmed to direct the desired sequence of application of the ribbon 12 to the particular article 14 involved.

According to the present invention, a ribbon moving means, generally designated 34, is interposed between the extruder 10 and the applicator 16. As illustrated, the ribbon moving means 34 is in the form of a conveyor but it is to be understood that other devices might be used in lieu thereof. For example, it is not unusual to employ ribbon temperature control drums about which the ribbon 12 is wound between the extruder 10 and the applicator 16 in systems of this general type.

In any event, the ribbon moving means 34 may have a pure conveying function or it may combine a conveying function with some other ribbon treating function.

As illustrated in FIG. 1, the ribbon moving means 34 is a pure conveyor application and includes a belt 36 trained about rollers 38 and 40 journaled on a frame 42. The upper run 44 of the belt 36 receives the ribbon 12 from guide rollers 46 and conveys the same to a guide roller 48 which in turn directs the ribbon to the applicator 16. In this connection, it will be noted that the conveyor frame 42 mounts a support 50 which in turn mounts the applicator 16. The conveyor frame 42 is mounted on rollers 52 and is movable towards and away from the path of movement of the article 14 under control of the three axis drive 30 to provide for positioning of the applicator 16 on the first mentioned axis. Additionally, by means to be described, the upper portion of the conveyor frame 42 is pivoted about generally vertical axes so as to be movable about such axes to position the applicator 16 about the second axis mentioned previously under control of the three axis drive 30. Control of the applicator 16 over the third axis mentioned above is preferably attained by movement of the applicator roll 20 and stitching rollers 22 by the applicator 16 itself.

The guide rollers 46 receive the ribbon 12 from guide rollers 54 mounted on a movable takeup carriage 56. The ribbon 12 is supplied to the guide rollers 54 by one or more guide rollers 58 which in turn receive the ribbon from a roller 60 which receives the the ribbon 12 from the extruder and/or calender rolls 10.

It will be appreciated that the precise path taken by the ribbon 12 from the extruder 10 to the applicator 16, and specifically, the applicator roll 20, will vary as the position of the applicator 16 moves with respect to that of the extruder 10. And, as alluded to previously, it is necessary to maintain strict stretch control to achieve accurate dimension control of the ribbon 12. Consequently,, if nothing more were done, the relative movement between the extruder 10 and the applicator 16 would result in periodic increasing and decreasing of the length of the path followed by the ribbon 12 with the consequence that the length of the ribbon 12 within that path would be subjected to greater or lesser amounts of strethcing precluding accurate dimension control. Therefore, means are employed whereby, even though the path taken by the ribbon 12 varies, the path length is fixed.

Figure 2:
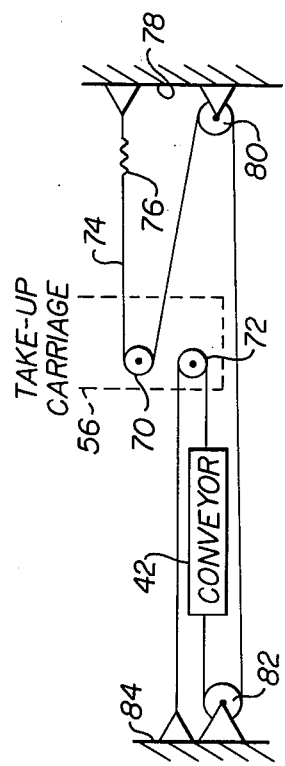
FIG. 2 is a schematic view of a cable system utilized in a conveyor so as to allow variation of the path of the ribbon while maintaining that path of fixed length.

Referring to FIG. 2, the take-up carriage 56 is shown schematically and mounts first and second sheaves 70 and 72. A cable 74 is fixed via a stiff spring 76 to a fixed abutment 78 to the right of the takeup carriage 56 as viewed in FIG. 1 and is first trained the sheave 70 and then about a sheave 80 also journaled to the abutment 78. From the sheave 80, the cable 74 passes to a sheave 82 journaled on a fixed abutment 84 to the left of both the conveyor and the take-up carriage 56, as viewed in FIG. 1. The cable 74 is taken from the sheave 82 and fixed to the movable carriage frame 42 of the conveyor as schematically illustrated in FIG. 2 and then trained about the sheave 72. From the sheave 72, the cable 74 is fixedly secured to the abutment 84.

As a consequence of this construction, when the position of the ribbon moving means 34 is shifted along the first axis, for each increment of such movement by the conveyor frame 42, the take-up carriage 56 will move half an increment of such movement. The manner in which the length of the path taken by the ribbon 12 is fixed will become apparent from the following example. If it be supposed that the conveyor frame 42 is moved to the right as viewed in FIG. 1 a distance of two inches, the take-up carriage 56 will move but a single inch. The length of ribbon between the guide roll 58 and the lower roller 54 on the take-up carriage 56 will increase by one inch. At the same time, the length of ribbon between the upper roller 54 on the carriage 56 and the roller 46 mounted on the carriage frame 42 will decrease by one inch, an equal, offsetting amount. All other parts of the ribbon path are fixed as will be apparent from the geometry illustrated in FIG. 1. So the overall length of the path remains the same even though the location of the path will vary.

As mentioned previously, the applicator 16 is movable about three axes to provide maximum system flexibility. In particular, such a range of applicator movement allows application of the strip not only to the crown of a tire as in prior art systems, but to the sidewalls as well. Control of the position of the applicator 16 about those three axes can be controlled through conventional numerical control systems as will be explained.

Figure 3:
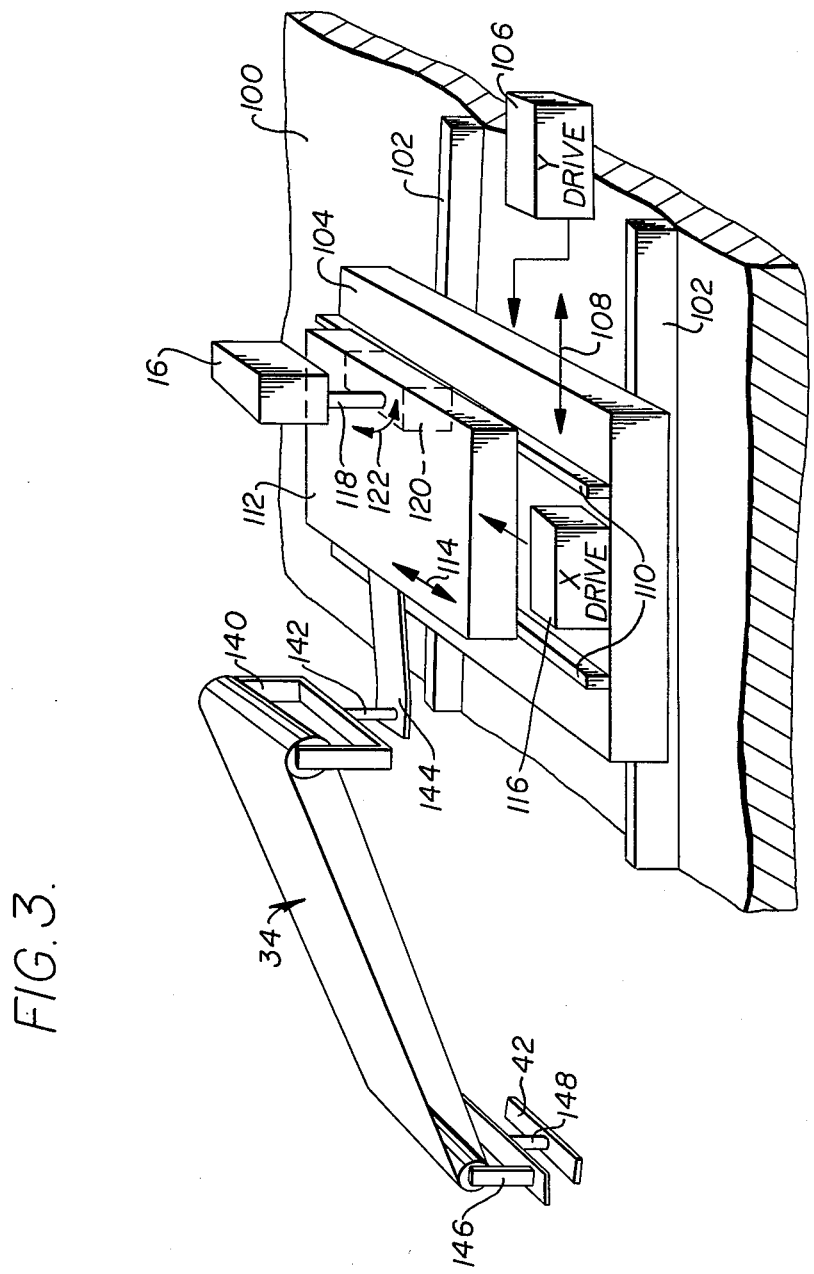
FIG. 3 is a perspective schematic of the mechanical structure.

Mechanically, the means by which three axes movement is achieved without altering the length of the path that the ribbon travels from the extruder 10 to the applicator 16 are shown in FIG. 3. An underlying surface supporting the system is shown at 100 and mounts, for example, a pair of spaced rails 102 which extend toward the article drive system 18 (shown in FIG. 1). Mounted for movement on the rails 102 is a carriage 104 and a drive system 106 which may be of conventional construction and of the type used in numerical control apparatus for moving the carriage 104 along the rails 102, bidirectionally, in the direction of an arrow 108. This may be designated the provision for providing movement about the so called "Y" axis.

The upper surface of the carriage 104 mounts, for example, a pair of rails 110 which are at right angles to the rails 102. A second carriage 112 is mounted for movement on the rails 110, bidirectionally, in the direction of an arrow 114. A drive unit 116, termed an "X" drive unit, is provided for shifting the carriage 112 as mentioned and is mounted on the carriage 104.

The applicator 16 is mounted for rotation about a vertical axis defined by a shaft 118 journaled on the carriage 112. A drive system 120 is provided for rotating the applicator 16 about the aforementioned axis, bidirectionally, in the direction of an arrow 122. The drive unit 120 is carried by the carriage 112.

As a result of the foregoing, it will be seen that the Y-drive unit 106 moves the applicator 16 toward and away from the article path while the X-drive unit 116 moves the applicator 16 along an axis transverse to the Y axis, that is, across the article path. The drive unit 120 drives the applicator such that the axis of rotation of the applicator roll 20 is parallel to the surface of the article to which the ribbon is applied, whether it be the original surface of the article 14 prior to ribbon application or the modified surface thereof as modified by the application of one or more layers of ribbon.

Through appropriate programming a conventional numerical control may be used to provide positive inputs to the X and Y-drive units 116,106, respectively, in a conventional fashion. In a numerical control unit, the Z axis control is utilized to provide an input to the drive unit 120. Those skilled in the art will recognize that rotary positioning is not typically controlled by the Z axis control in a numerical control but is done in the present invention for the purpose of insuring that the applicator roll 20 will move to the commanded coordinates in a coordinated fashion typical of the mode of control over those three axes provided by a conventional numerical control.

In order to achieve this interrelationship as far as the drive unit 120 is concerned, a mechanical provision must be made since the Z axis control in a numerical control provides information for linear movement rather than pivotal movement. This is easily attended to through suitable mechanical gearing between the drive unit 120 and the applicator head 16 such that, for example, one revolution of the drive motor in the drive unit 120 will cause rotation of the applicator 16 a predetermined number of degrees as, for example, one degree. In this way, a predetermined linear command from the numerical control to the drive unit 120 is translated mechanically into a predetermined angular so as to achieve the desired relation of the applicator roll 20 to the surface of the article 14.

FIG. 3 also illustrates the interrelationship between the applicator 16, its three axis drive, and the conveyor 34. Because considerably movement of the applicator 16 relative to the extruder may occur, it is necessary that the conveyor 34 follow the applicator to properly convey the ribbon to the applicator 16. At the same time, it is desired that the length of the path of ribbon movement remain fixed as mentioned previously.

To this end, the end of the conveyor 34 nearest the applicator 16 is supported by a yoke 140 which in turn is pivoted about a vertical axis by a shaft 142 to a drawbar 144 connected to the carriage 112.

The end of the conveyor 34 remote from the applicator 16 is likewise supported by a yoke 146 which is pivoted about a vertical axis by shaft 148 which in turn is connected to the conveyor frame 42, shown only schematically in FIG. 3.

As a consequence of this construction, when the Y-drive unit 106 shifts the applicator 16 in the direction of the arrow 108, the conveyor will roll on the rollers 52 (FIG. 1). Conversely, when the carriage 112 is moved by the X-drive unit 116, not only will some rolling on the rollers 52 occur, but there will also be pivoting about the axes defined by the shafts 142,148.

In order to insure that pivoting of the conveyor in response to X axis movement does not change the length of the ribbon path, it will be observed from FIG. 1 that the uppermost roller 46 guides the ribbon onto the conveyor in a vertical path while the roller 48 takes the ribbon off the conveyor in a vertical path. The location of the shaft 148 is made coincident with the vertical path between the uppermost roller 46 in the conveyor and is shown at A in FIG. 1. In a similar vein, the axis of the shaft 142 is made to coincide with the vertical path of the ribbon to the roller 48 and is shown at B in FIG. 1. Finally, to insure that pivoting of the applicator 16 in response to operation of the unit 120 does not change the length of the path, rollers 160,162 are provided to guide the ribbon in a vertical path which coincides with the axis of rotation provided by the shaft 118 mounting the applicator 16. This axis is designated C in FIG. 1.

Turning now to FIG. 4, a significant mechanical component of the system will be described. Specifically, there is shown the applicator roller 20 in greater detail. The same includes a slightly barrel-shaped outer surface 170 which may be of conventional configuration and which is journaled by bearings 172 on a sleeve 174. The sleeve 174 is, in turn, secured to the applicator 16 in any desired fashion. Within the sleeve 174 is an electrical resolver 176 having a rotary input shaft 178. The input shaft 178 mounts a carrier 180 which in turn journals one or more planet gears 182 for rotation about axes displaced from the axis of rotation of the input shaft 178. The end of the sleeve 174 from which the shaft 178 extends mounts a fixed ring gear 184 which is coaxial with the shaft 178 and which engages the planet gears 182.

The corresponding end of the applicator roll 20 is closed by a cap 186 secured in place by a set-screw 188. An inwardly directed collar 190 on the cap 186 terminates in a sun gear 192 which is coaxial with the shaft 178 and which is meshed with the planet gears 182. As a consequence, a reduction gear train is provided whereby the rotation of the applicator roller 20 is conveyed to the input shaft 178 of the resolver 176 at a reduced rate as, for example, a four or five-to-one reduction. The resolver 176 provides output signals which are utilized in a control system to achieve accurate stretch control of the ribbon from the extruder to the point of application by the applicator roller 20 to achieve accurate dimensional control. This stretching occurs between the extruder 10 and the applicator roller 20. In the present invention, a first amount of stretch is supplied by driving the belt 36 at a higher linear rate than the rate of extrusion of the ribbon 12 from the extruder. A second stretch can be obtained by moving the article 14 in its path such that the surface to which the ribbon is being applied is moved at a greater rate than the rate of movement of the upper run of the belt 36 thereby drawing the ribbon off the applicator roller 20 at that higher rate. Extremely accurate control over this stretching is provided by reason of the fixed length of the ribbon path to the applicator roller 20 as well as by providing control over the rate of movement of the ribbon by the ribbon moving means 34 and the rate at which the ribbon is drawn over the applicator roller 20 by controlling the rate of movement of the article in its path. The means by which such control is exercised are illustrated in FIG. 5.

Specifically, there is provided an encoder 200 of conventional construction which provides a cyclic electrical wave output proportional to the rate of revolution of its input shaft. The encoder 200 is suitably mechanically coupled to the roller 60 (FIG. 1) receiving the ribbon 12 from the extruder 10. As a consequence the encoder 200 provides a pulsing output signal representative of the rate of ribbon extrusion by the extruder 10. Stated another way, the signal is representative of the rate of receipt of the ribbon 12 by the roller 60. Those skilled in the art will recognize that the signal is basically a position signal as opposed to velocity signal which is highly preferred for use in the servo system to be described since velocity servo systems are significantly more difficult to control than position servo systems.

The output of the encoder 200 is provided to a conventional divider circuit 202 which is operative to reduce the number of cycles per unit of time received from the encoder 200 to some lesser number. A manual input 204 is employed to control the divider 202 to provide the desired proportioning which will determine the degree of stretch provided between the extruder and the conveyor.

A drive motor 206 is used to drive the ribbon moving means 34 and is coupled to an encoder 208 which in turn provides a cyclic electrical output representative of the rate at which the upper run 36 of the ribbon moving means is being driven, again a position signal rather than a velocity signal. This signal is provided on a line 210 to the divider circuit 202 as a feedback signal which is then compared with the proportioned signal from the encoder 200 to issue a command signal on a line 212 which is in turn provided to the drive motor 206 and its speed control circuit.

As a consequence, the ribbon moving means 34 will drive the ribbon at a linear rate faster than it is being extruded from the extruder to provide stretch between the two points. Should the extrusion rate drop off, the command signal on the line 212 will cause the drive motor 206 to slow down. Should the extrusion rate increase, there will be a corresponding proportioned increase in the drive rate from the drive motor 206.

The proportioned signal from the divider 202 which is representative, in a proportioned fashion, of the rate of extrusion, is fed on a line 214 to a second divider 216 which may be similar or identical to the divider 202 and which likewise reduces the number of cycles in the signal received to some lesser number per unit of time in accordance with a control input provided by a manually operable selection device 218. The proportion selected controls the degree of stretch between the article moving means 34 and the applicator roller 20.

A command signal for controlling the rate at which the article is driven in its path by the article drive 18 is issued to cause the same to increase, decrease, or not modify the rate of article movement proportionate to the rate of extrusion from the extruder 10. As shown in FIG. 5, the article drive 18 drives the article 14 which, in turn, tends to drive the applicator roller 20 by drawing the ribbon off the same. The resolver 176 within the applicator roller provides a feedback signal on a line 220 to the divider 216 which is indicative of the rate of application of the ribbon to the article 14. Again, the signal on the line 220 is a position feedback signal and not a velocity signal. Consequently, the article drive 18 drives the article 14 at a variable rate of speed which is proportional to the rate of extrusion of the ribbon by the extruder 10.

It should be understood that the particular use of the applicator roller 20 in generating the feedback signal for control purposes is highly advantageous since it automatically compensates for variations in the geometry of the article 14 which could not be sensed if the feedback was taken from a direct mechanical coupling of a sensor to the article drive 18. For example, when considering the application of the ribbon to the sidewall of a tire, it will be recognized that the linear velocity at which the ribbon 12 is being applied to the sidewall of the tire for a given rate of rotation of the tire will vary depending upon whether the point of application is relatively radially innermost or relatively radially outermost. Feedback from the article drive is incapable of detecting this difference. Conversely, feedback from the applicator roller 20 will automatically sense a greater rate of linear movement of application as a radially outer position of application is approached by movement of the applicator 16 under the influence of the three axis drive. Thus, extremely accurate stretch control, and thus, dimensional control of the ribbon being applied is achieved through use of the present invention enabling wholly automatic operation of the system through appropriate programming of the three axis drive 30 by a computer such as the computer 32 which, of course, will be dependent upon the article being processed and the desired application of ribbon thereto.

It should be observed that the use of a resolver such as the resolver 176 in connection with the applicator roll 20 is highly desired. Because of the small size of resolvers such as the resolver 176 as opposed to encoders such as the encoders 200, 208, the same may be readily incorporated within the applicator 16 without unduly increasing its size which would limit flexibility of the system by reason of potential interference between the article 14, supporting components therefor, and parts of the applicator 16.

Finally, while the control system of the invention has been illustrated and described as so-called "hardware", the invention specifically contemplates the use of an appropriately programmed computer, such as a microprocessor, in lieu of such hardware components as the divider units 202, 216 and portions or all of the manual inputs 204, 218 and other like means.

INDUSTRIAL APPLICABILITY

A control system for an extrusion and application apparatus for applying an elastomeric ribbon to an article made according to the invention is ideally suited for use in production environments where low labor requirements are highly desirable. The system of the invention provides excellent dimensional control over the ribbon, compensating for all the variables in the application process upstream of the applicator itself so that excellent dimension control of the ribbon can be obtained thereby further lending to system use and automatic operation. Because of the excellent control achieved through use of the system, it is no longer necessary to apply an excess of ribbon to an article to insure that the article will obtain its desired external configuration. Consequently, material costs are lowered and the need for subsequent operations, such as trimming, is avoided.

I claim:

1. In a control system for an elastomer extrusion and application apparatus including:
    means for receiving a continuous, moving extruded elastomeric ribbon and for providing a signal representing the rate of ribbon receipt;
    a first rate dividing means receiving said ribbon receipt signal;
    ribbon moving means receiving said ribbon from said receiving means for advancing the ribbon along a variable path of fixed length;
    means connected to said ribbon moving means for providing a signal representing the rate of ribbon movement along said path;
    a first servo system including said first rate dividing means for receiving said ribbon movement signal to operate said ribbon moving means so as to cause the ribbon to be moved in said ribbon path at a first rate higher than said rate of ribbon receipt at a fixed proportion determined by said first rate dividing means;
    means for moving an article to have the ribbon applied thereto in a predetermined article path at the end of said ribbon path; and
    an applicator at the end of said ribbon path for receiving the ribbon from the ribbon moving means and for applying the ribbon to an article moving in said article path and including a rotary applicator roller;
    the improvement comprising:
    a resolver connected to said applicator roller for providing a signal representing the rate of rotation of said roller and thus the rate of ribbon application;
    a second rate dividing means receiving said ribbon receipt signal;

a second servo system including said second rate dividing means for receiving said rate of rotation signal to operate said article moving means so as to cause the article to be moved in said article path to draw ribbon off of said applicator roller at a second rate equal to or greater than said first rate at a fixed proportion determined by said second rate dividing means.

2. The control system of claim 1 wherein said resolver is housed within said roller and connected thereto by a reduction gear train.

3. In a control system for an elastomer extrusion and application apparatus including:
  extrusion rate measuring means adapted to be associated with the output of an extruder for receiving a ribbon of extruded elastomer and for providing a signal representing the rate of extrusion;
  means for moving an article to have the ribbon of extruded elastomer applied thereto in a predetermined path; and
  applicator means along said path for receiving a ribbon of extruded elastomer and applying the same to an article moving in said path;
  the improvement comprising:
  means connected to and driven by said applicator means for providing a signal representative of the rate of application of the ribbon to the article;
  control means for controlling the speed of said moving means including means for receiving said signals and adjusting the speed of said moving means to match a desired proportion between said rate of extrusion and said rate of application;
  whereby the ribbon may be stretched a desired controlled amount prior to application and subsequent to extrusion.

4. In a control system for an elastomer extrusion and application apparatus including:
  extrusion rate measuring means adapted to be associated with the output of an extruder for receiving a ribbon of extruded elastomer and for providing a signal representing the rate of extrusion;
  article moving means for moving an article to have the ribbon of extruded elastomer applied thereto to a predetermined path;
  applicator means along said path for receiving a ribbon of extruded elastomer and applying the same to an article moving in said path;
  ribbon moving means between said extrusion rate measuring means and said applicator means for moving the ribbon from said extrusion rate measuring means to said applicator means;
  means for driving said ribbon moving means; and
  a first speed control for said driving means including means providing a signal representing the rate of movement of said ribbon by said ribbon moving means, and means for receiving said movement rate and extrusion rate signals and for adjusting the speed of said driving means to match a desired proportion between said rate of extrusion and said rate of movement;
  the improvement comprising:
  means connected to said applicator means for providing a signal representative of the rate of application of the ribbon to the article;
  second speed control means for controlling the speed of said article moving means including means for receiving at least one of said extrusion rate and said movement rate signals and said application rate signal and for adjusting the speed of said article moving means to match a desired proportion between said rate of extrusion and said rate of application; and
  means for selectively changing the value of either of said desired proportions.

5. The control system of claim 4 wherein said applicator means includes an applicator roller, said rate of application signal providing means comprising a resolver having an input rotatable with said roller.

6. In a control system for an extrusion and application apparatus including:
  extrusion rate measuring means adapted to be associated with the output of an extruder for receiving a ribbon of extruded material and for providing a signal representing the rate of extrusion;
  means for moving an article to have the ribbon of extruded material applied thereto in a predetermined path; and
  applicator means along said path for receiving a ribbon of extruded material and applying the same to an article moving in said path;
  the improvement comprising:
  means connected to and driven by said applicator means for providing a signal representative of the rate of application of the ribbon to the article; and
  control means for controlling the speed of said moving means including means for receiving said signals and adjusting the speed of said moving means to match a desired proportion between said rate of extrusion and said rate of application.

7. The control system of claim 6 further including:
  ribbon conveying means interposed between said extrusion rate measuring means and said applicator means for receiving the ribbon from said extrusion rate measuring means and conveying the same to said applicator means;
  means for driving said ribbon conveying means; and
  speed control means for said driving means including means for providing a signal representing the rate of conveying of said ribbon by said conveying means, and means for receiving said conveying rate and extrusion rate signals and for adjusting the speed of said driving means to match a desired proportion between said rate of extrusion and said rate of conveying.

8. The control system of claim 6 or 7 wherein means are provided for selectively changing the value of said desired proportion.

9. The control system of claim 6 wherein said applicator means comprises an applicator roller and wherein said rate of application signal providing means comprises a signaling device housed by said roller and having a rotary input shaft, and a planetary reduction gear system interconnecting said roller and said shaft.

10. The control system of claim 9 wherein said roller is journaled on a fixed structure with said signaling device being secured to said fixed structure, said planetary gear system including a sun gear secured to and within said roller and coaxial with said shaft, a carrier mounted on said shaft, at least one planet gear journaled on said carrier and meshed with said sun gear, and a ring gear meshed with said planet gear and coaxial with said shaft, said ring gear being secured to said fixed structure.

11. The control system of claim 10 wherein said fixed structure comprises a sleeve with said roller being journaled on the exterior thereof and said signaling device is received in the interior thereof, said signaling device comprising a resolver.

12. In an elastomeric ribbon extrusion and applicator apparatus including an extruder for generating an elastomeric ribbon, an applicator roller for applying between the roller and the article, and control means for controlling at least one of the rate of extrusion and the rate of application in response to a signal generated during operation of the apparatus, the improvement wherein said signal is generated by a resolver having a rotary input shaft, a sleeve housing and mounting said resolver, said roller being journaled on said sleeve, and a reduction gear train interconnecting said shaft and said roller.

13. The apparatus of claim 12 wherein said gear train includes a carrier mounted on said shaft for rotation therewith, at least one planet gear journaled on said carrier for rotation about an axis spaced from the axis of said shaft, a ring gear coaxial with said shaft and mounted on an end of said sleeve and meshed with said planet gear, and a sun gear coaxial with said shaft and meshed with said planet gear, said sun gear being coupled to said roller for rotation therewith.

14. In an elastomeric ribbon application system, the combination of:
  means for moving an article to have an elastomeric ribbon applied thereto in a predetermined path;
  an applicator adjacent said path for applying a ribbon to an article in said path and including an applicator roller rotatable about an axis;
  means mounting said applicator for movement (a) along a first axis generally across said path, (b) along a second axis towards and away from said path, and (c) about a third axis such that said applicator roller axis will be generally parallel to the surface of the article to which the ribbon is applied;
  means for moving said applicator about said first, second and third axes;
  ribbon forming means for providing an elastomeric ribbon to said applicator;
  means for providing a signal representing the provision of ribbon by said forming means to said applicator;
  means connected to and driven by said applicator roller for providing a signal representing application of the ribbon to the article; and
  a servo system receiving said signals and controlling the speed of said article moving means to thereby control the rate at which the ribbon is applied to the article by being drawn over the applicator roller irrespective of variation in the provision of the ribbon to the applicator and varying geometry of the article.

15. In an elastomeric ribbon application system, the combination of:
  means for moving an article to have an elastomeric ribbon applied thereto in a predetermined path;
  an applicator adjacent said path for applying a ribbon to an article in said path and including an applicator roller rotatable about an axis;
  means mounting said applicator for movement (a) along a first axis generally across said path, (b) along a second axis towards and away from said path, and (c) about a third axis such that said applicator roller axis will be generally parallel to the surface of the article to which the ribbon is applied;
  means for moving said applicator about said first, second and third axes;
  ribbon providing means for providing an elastomeric ribbon to be applied to the article;
  first means providing a first signal representing ribbon provision from said ribbon providing means;
  means for moving the ribbon from the ribbon providing means to the applicator;
  second means providing a second signal representing ribbon movement by the ribbon moving means;
  a first servo system receiving said first and second signals and controlling said ribbon moving means to move ribbon at a first, faster proportioned rate than it is provided by the ribbon providing means;
  third means providing a third signal representing the application of ribbon to the article; and
  a second servo system receiving said third signal and one of said first and second signals to control said article moving means to cause application of ribbon the article at a second proportioned rate faster than said first proportioned rate.

16. The system of claim 15 wherein said third means is connected to and driven by said applicator roll.

17. In an elastomeric ribbon application system, the combination of:
  means for moving an article to have an elastomeric ribbon applied thereto in a predetermined path;
  an applicator adjacent said path for applying a ribbon to an article in said path and including an applicator roller rotatable about an axis;
  means mounting said applicator for movement (a) along a first axis generally across said path, (b) along a second axis towards and away from said path, and (c) about a third axis such that said applicator roller axis will be generally parallel to the surface of the article to which the ribbon is applied;
  means for moving said applicator about said first second and third axes;
  ribbon providing means for providing ribbon to be applied to an article;
  a conveyor for conveying ribbon to said applicator;
  means mounting said conveyor for conjoint movement with said applicator;
  a movable take-up carriage receiving ribbon from said ribbon providing means and directing it to the conveyor;
  and means interconnecting said take-up carriage and said conveyor for synchronized movement such that for varying paths of ribbon movement from the ribbon providing means to the applicator, the length of said paths will remain at a fixed value.

* * * * *